United States Patent
Ghosh et al.

(10) Patent No.: US 10,938,678 B2
(45) Date of Patent: Mar. 2, 2021

(54) AUTOMATION PLAN GENERATION AND TICKET CLASSIFICATION FOR AUTOMATED TICKET RESOLUTION

(71) Applicant: Accenture Global Solutions Limited, Dublin (IE)

(72) Inventors: Bhaskar Ghosh, Bengaluru (IN); Mohan Sekhar, Bangalore (IN); Rajendra T. Prasad, Bangalore (IN); Luke Higgins, West Pymble (AU); Koushik Vijayaraghavan, Chennai (IN); Rajesh Nagarajan, Chennai (IN); Purnima Jagannathan, Chennai (IN); Niyaz Shaffi, Tirunelveli (IN); Balaji Venkateswaran, Chennai (IN); Syed Mohammed Yusuf, Chennai (IN); Koustuv Jana, Bangalore (IN); Pradeep Senapati, Bangalore (IN)

(73) Assignee: Accenture Global Solutions Limited, Dublin (IE)

(*) Notice: Subject to any disclaimer, the term of this patent is extended or adjusted under 35 U.S.C. 154(b) by 68 days.

(21) Appl. No.: 16/359,672

(22) Filed: Mar. 20, 2019

(65) Prior Publication Data
US 2020/0065151 A1 Feb. 27, 2020

(30) Foreign Application Priority Data
Aug. 21, 2018 (IN) .............................. 201841031278

(51) Int. Cl.
*G06F 9/46* (2006.01)
*H04L 12/24* (2006.01)
(Continued)

(52) U.S. Cl.
CPC ........ *H04L 41/5074* (2013.01); *G06F 9/5027* (2013.01); *G06F 40/295* (2020.01);
(Continued)

(58) Field of Classification Search
CPC ............. G06K 9/6231; G06Q 10/0635; G06Q 10/06316; G06Q 10/06; G06Q 10/06313;
(Continued)

(56) References Cited

U.S. PATENT DOCUMENTS 9,262,731 B1 * 2/2016 Koushik ................. G06Q 10/06
2013/0006701 A1 * 1/2013 Guven ............... G06Q 10/0635
705/7.28
(Continued)

*Primary Examiner* — Tuan A Vu
(74) *Attorney, Agent, or Firm* — Harrity & Harrity, LLP

(57) ABSTRACT

A device may obtain ticket data relating to a set of tickets, and process the ticket data to generate a ticket analysis model that is a clustering based natural language analysis model of natural language text associated with tickets of the set of tickets. The device may classify the set of tickets using the ticket analysis model, may determine an automation plan for at least one class of ticket determined based on classifying the set of tickets, and may implement the automation plan to configure an automatic ticket resolution or ticket generation mitigation procedure for the at least one class of ticket. The device may receive a ticket after configuring the automatic ticket resolution or ticket generation mitigation procedure, may classify, using the ticket analysis model, the ticket into the at least one class of ticket, and may automatically implement a response action for the ticket based on classifying the ticket and using the automatic ticket resolution or ticket generation mitigation procedure.

20 Claims, 9 Drawing Sheets

(51) Int. Cl.
    *G06F 9/50*       (2006.01)
    *G06F 40/30*     (2020.01)
    *G06F 40/295*   (2020.01)
    *G06F 16/35*     (2019.01)
    *G06Q 10/06*     (2012.01)
    *G06K 9/62*      (2006.01)

(52) U.S. Cl.
    CPC ............ *G06F 40/30* (2020.01); *G06F 16/355* (2019.01); *G06K 9/6231* (2013.01); *G06Q 10/06* (2013.01); *G06Q 10/06313* (2013.01); *H04L 41/5067* (2013.01)

(58) Field of Classification Search
    CPC .......... G06F 8/60; G06F 16/358; G06F 40/30; G06F 40/295; G06F 16/35; G06F 16/355; G06N 20/20; G06N 7/005; H04L 41/5067; H04L 41/5074
    See application file for complete search history.

(56) References Cited

U.S. PATENT DOCUMENTS

| | | | |
|---|---|---|---|
| 2014/0129536 A1* | 5/2014 | Anand .................. | G06N 7/005 707/706 |
| 2016/0378859 A1* | 12/2016 | Banik .................. | G06F 16/358 707/708 |
| 2017/0076296 A1* | 3/2017 | Hirpara ............ | G06Q 10/06316 |
| 2017/0178038 A1 | 6/2017 | Guven et al. | |
| 2017/0212756 A1* | 7/2017 | Ryali ....................... | G06F 8/60 |
| 2019/0347282 A1* | 11/2019 | Cai ..................... | G06K 9/6231 |
| 2020/0019935 A1* | 1/2020 | Jan ........................ | G06N 20/20 |

* cited by examiner

AUTOMATION PLAN GENERATION AND TICKET CLASSIFICATION FOR AUTOMATED TICKET RESOLUTION

RELATED APPLICATION

This application claims priority under 35 U.S.C. § 119 to Indian Patent Application No. 201841031278, filed on Aug. 21, 2018, the content of which is incorporated by reference herein in its entirety.

BACKGROUND

Using a ticket management system to classify and resolve issues may be difficult in situations where different parties interact in a multitude of different situations, creating a massive number of issues to resolve. Manual classification and/or resolution of issues may be impossible when tens of thousands, hundreds of thousands, or even millions of issues need to be resolved.

SUMMARY

According to some possible implementations, a device may include one or more memories, and one or more processors, communicatively coupled to the one or more memories, to obtain ticket data relating to a set of tickets, and to process the ticket data to generate a ticket analysis model, wherein the ticket analysis model is a clustering based natural language analysis model of ticket descriptions for tickets of the set of tickets. The one or more processors may classify, using the ticket analysis model, the set of tickets, may determine, for at least one class of ticket determined based on classifying the set of tickets, an automation plan for the at least one class of ticket, and may implement the automation plan to configure an automatic ticket resolution or ticket generation mitigation procedure for the at least one class of ticket. The one or more processors may receive a ticket after configuring the automatic ticket resolution or ticket generation mitigation procedure, may classify, using the ticket analysis model, the ticket into the at least one class of ticket, and may automatically implement a response action for the ticket based on classifying the ticket into the at least one class of ticket and using the automatic ticket resolution or ticket generation mitigation procedure.

According to some possible implementations, a method may include receiving, by a device, a request to generate an automation plan for resolving incoming tickets, and obtaining, by the device, ticket data based on receiving the request. The method may include processing, by the device, natural language descriptions of tickets in the ticket data to generate a ticket analysis model for classifying tickets into at least one of a plurality of classes of tickets, wherein the plurality of classes of tickets are a set of clusters identified by the ticket analysis model. The method may include determining, by the device and for a class of tickets of the plurality of classes of tickets, the automation plan for resolving a portion of the incoming tickets classified into the class. The method may include receiving, by the device, a ticket after determining the automation plan, and classifying, by the device and using the ticket analysis model, the ticket into the class of tickets of the plurality of classes of tickets. The method may include automatically resolving, by the device, the ticket based on the automation plan based on classifying the ticket into the class of tickets of the plurality of classes of tickets.

According to some possible implementations, a non-transitory computer-readable medium may store instructions that include one or more instructions that, when executed by one or more processors of a device, cause the one or more processors to obtain ticket data relating to a set of tickets, and to process the ticket data to identify a set of ticket clusters. The one or more instructions may cause the one or more processors to determine, for at least one cluster, an automation plan, and to implement the automation plan to configure an automatic ticket resolution or ticket generation mitigation procedure for the at least one cluster, wherein implementing the automation plan comprises configuring monitoring for tickets of a type corresponding to the at least one cluster, allocating resources for resolving detected tickets of the type corresponding to the at least one cluster, and providing a user interface including a visualization of data relating to the resolving of detected tickets of the type corresponding to the at least one cluster.

DETAILED DESCRIPTION

Figure 1A:
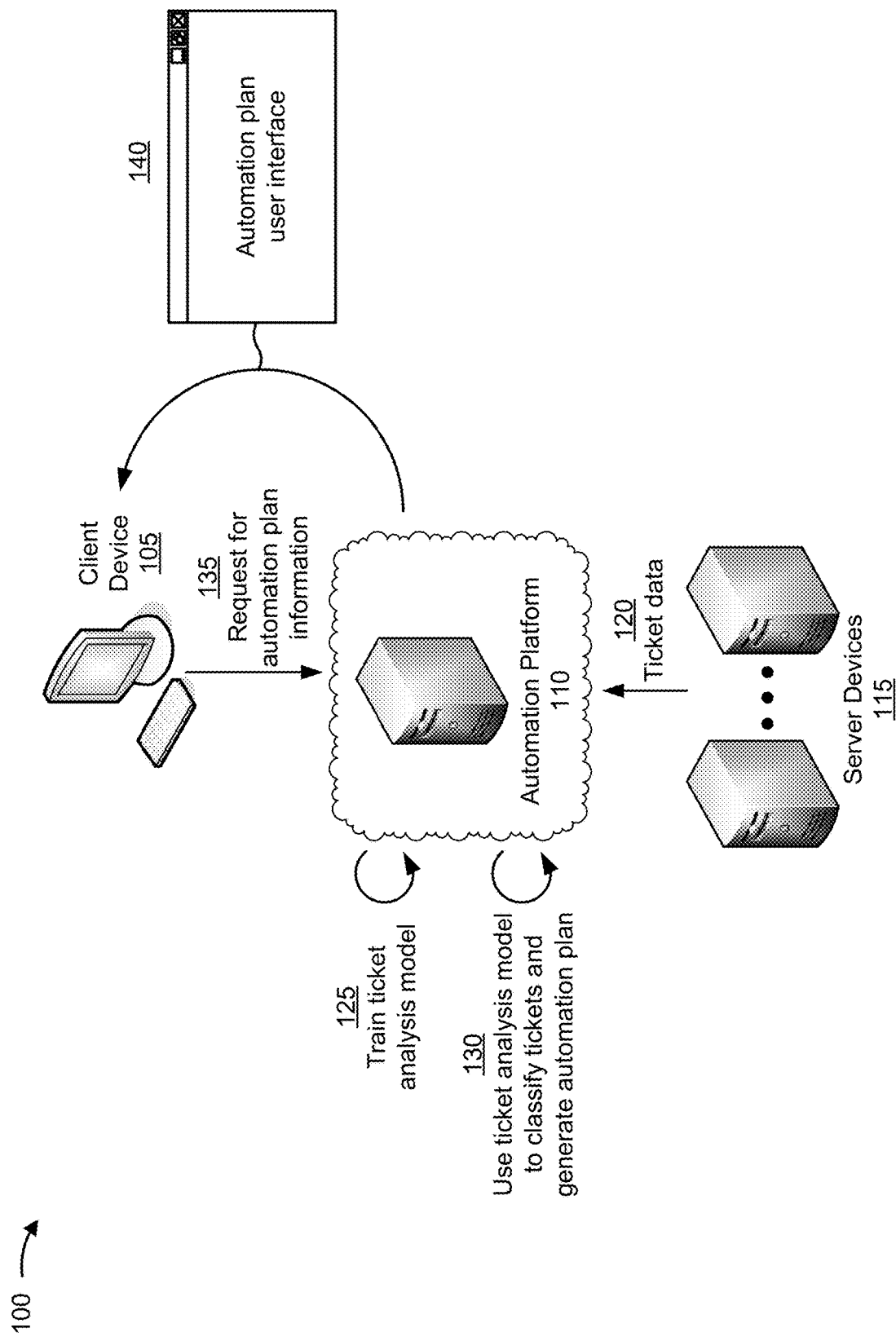
FIGS. 1A-1D are diagrams of an example implementation described herein.

The following detailed description of example implementations refers to the accompanying drawings. The same reference numbers in different drawings may identify the same or similar elements.

A ticket management system may resolve issues indicated by ticket data. In some cases, resolving the issue with human intervention may be time and resource intensive, while also being prone to human error. This may result in a poor user experience, and may lead to excessive use of computing resources (e.g., from a person researching a ticket, providing a failed resolution, re-researching the ticket, providing another resolution, etc.). In other cases, resolving a ticket issue (with or without human intervention) may be difficult due to the ticket management system receiving a large volume of ticket data relating to a multitude of different issues. This may result in high computer processing and/or storage costs. For example, applying a ticket management system in a field that uses big data may require resolving issues for tens of thousands, hundreds of thousands, or even millions of tickets.

Implementations described herein may provide for a cloud platform to automatically classify ticket data, identify an automation plan for automatically resolving groups of tickets assigned to a common class, and to implement the automation plan to automatically resolve the groups of tickets. In this way, the cloud platform reduces utilization of computing resources based on faster resolution of a ticket issue (e.g., less resources may be needed to resolve the ticket issue), reduces utilization of computing resources and/or network resources based on decreasing a period of time where a network device is using additional resources to complete a task (e.g. a network device may use less resources to complete a task when operating properly), or the like. By reducing the utilization of computing resources, the cloud platform improves overall system performance due to efficient and effective allocation of resources. Furthermore, faster resolution of a ticket issue improves user experience and minimizes time that a user may lose due to the ticket issue (e.g., a user may be unable to work if experiencing a technical error).

Furthermore, implementations described herein use a rigorous, computerized process to classify tickets, generate automation plans, and resolve classified tickets that were not previously performed or were previously performed using subjective human intuition or input. For example, currently there does not exist a technique to accurately generate an automation plan for automating resolution of thousands, millions, or tens of millions of tickets. Finally, automating the process for classifying tickets and generating an automation plan conserves computing resources (e.g., processor resources, memory resources, and/or the like) that would otherwise be wasted in attempting to manually and inefficiently complete ticket resolution tasks that may be automatable, by ensuring that automatable ticket resolution procedures are implemented when available for a particular class of ticket.

FIGS. 1A-1D are diagrams of an example implementation 100 described herein. As shown in FIG. 1A, example implementation 100 may include a client device 105, an automation platform 110, and a set of server devices 115.

As further shown in FIG. 1A, and by reference number 120, automation platform 110 may obtain ticket data. For example, automation platform 110 may obtain ticket data from one or more server devices 115 storing historical ticket data relating to a set of tickets previously received for resolution. Additionally, or alternatively, automation platform 110 may obtain ticket data in real-time or near real-time, such as based on a ticket being received via a ticket resolution portal provided by automation platform 110 and associated with obtaining tickets relating to errors with a system. In some implementations, automation platform 110 may obtain ticket data relating to a particular project. For example, automation platform 110 may identify a particular software development project (e.g., a software project in a development phase, a software project in a testing phase, a software project in an ongoing management phase, and/or the like).

In some implementations, automation platform 110 may obtain a particular type of ticket data. For example, automation platform 110 may receive ticket data associated with a particular format. In this case, automation platform 110 may receive ticket data including natural language descriptions of tickets, errors associated therewith, resolutions to the errors, and/or the like. Additionally, or alternatively, automation platform 110 may obtain numeric ticket data, program code associated with resolutions to tickets, and/or the like. In some implementations, automation platform 110 may obtain ticket data identifying one or more attributes of a set of tickets, such as a user-defined classification of a ticket, a source of the ticket, a resolution applied to the ticket, and/or the like. Additionally, or alternatively, automation platform 110 may obtain ticket data identifying an inflow of tickets. Additionally, or alternatively, automation platform 110 may obtain ticket data identifying an asset catalogue. For example, automation platform 110 may receive information identifying a set of ticket resolution descriptions of a set of assets of the asset catalogue for automatically resolving a ticket or for avoiding generation of a ticket (e.g., automated ticket generation mitigation) by avoiding an occurrence of a problem.

An asset may be used to automatically resolve a ticket. For example, an asset may include a software program or an application that is configured to automatically resolve one or more known issues in another software program, a software program configured to generate code, alter code, copy code, and/or the like based on one or more code repositories to alter, add, remove, and/or the like functionality associated with a software program to resolve an error. In this case, based on identifying an application that may be used to resolve a class of tickets, automation platform 110 may, upon classifying a ticket into the class of tickets, provide information associated with the ticket to the application to enable the application to automatically resolve the ticket. Additionally, or alternatively, the asset may include a workflow for resolving an issue, such as a set of procedures that automation platform 110 and/or one or more resources allocated therewith may complete to resolve a ticket. As an example, a procedure may include changing a resource allocation to a software program in a particular manner to resolve an issue relating to resource allocation, erasing and rewriting data relating to a software program, and/or the like.

Additionally, or alternatively, the asset may be a semi-automatic asset, such as an asset that operates a chatbot for obtaining additional information about a ticket and automatically providing an alert to a preselected entity, such as providing the additional information to a developer to enable the developer to resolve an error more effectively than with information already provided in a ticket submission. Additionally, or alternatively, the asset may be a scheduling asset for scheduling ticket resolution, hiring employees for ticket resolution, and/or the like. In some implementations, automation platform 110 may evaluate the assets to determine one or more or assets that may be used to resolve tickets. For example, automation platform 110 may use natural language processing to process application descriptions and/or user comments regarding applications in an application store, workflows in a workflow repository, and/or the like to identify applications to use for resolving tickets, workflows to automatically follow to resolve tickets, and/or the like.

In some implementations, automation platform 110 may obtain a subset of available ticket data. For example, automation platform 110 may obtain ticket data relating to a particular organization or a set of organizations. In this case, automation platform 110 may identify a set of similar organizations to a particular organization for which ticket classification is to be performed, such as based on a common industry, a common set of roles, a common location, and/or the like, and may obtain ticket data relating to tickets of the set of similar organizations. In this way, automation platform 110 may enable generation of a model with reduced ticket data relative to using ticket data relating to non-similar organizations, which may result in a model trained to perform classifications of types of tickets that are unlikely to be generated for software associated with the particular organization. Based on reducing the amount of ticket data, automation platform 110 may reduce a utilization of processing resources to process the ticket data, memory resources to store the ticket data, network resources to obtain the ticket data, and/or the like.

As further shown in FIG. 1A, and by reference numbers 125 and 130, automation platform 110 may train a ticket analysis model, and may use the ticket analysis model to classify tickets and generate an automation plan for automatically classifying groups of tickets. For example, automation platform 110 may process the ticket data to generate the ticket analysis model, which may be a clustering based natural language analysis model of classifying tickets based on natural language text, such as ticket descriptions. In some implementations, automation platform 110 may perform a set of data manipulation procedures to process the ticket data to generate the ticket analysis model, such as a data preprocessing procedure, a model training procedure, a model verification procedure, and/or the like.

In some implementations, automation platform 110 may perform a data preprocessing procedure when generating the ticket analysis model. For example, automation platform 110 may preprocess the ticket data to remove non-ASCII characters, white spaces, confidential data, and/or the like. In this way, automation platform 110 may organize thousands, millions, or billions of data entries for machine learning and model generation—a data set that cannot be processed objectively by a human actor. Additionally, or alternatively, automation platform 110 may remove numbers from the ticket data, other special characters from the ticket data, stop words from the ticket data, punctuation from the ticket data, whitespaces from the ticket data, and/or the like. In some implementations, automation platform 110 may perform a stemming operation on words of the ticket data to identify roots of the words of the ticket data and based on a stemming data structure identifying roots for words.

In some implementations, automation platform 110 may perform a training operation when generating the ticket analysis model. For example, automation platform 110 may portion the data into a training set, a validation set, a test set, and/or the like. In some implementations, automation platform 110 may train the ticket analysis model using, for example, an unsupervised training procedure and based on the training set of the data. In some implementations, automation platform 110 may perform dimensionality reduction to reduce the data to a minimum feature set, thereby reducing processing to train the model of activity automatability, and may apply a classification technique, to the minimum feature set.

In some implementations, automation platform 110 may use a logistic regression classification technique to determine a categorical outcome (e.g., that a ticket is to be assigned to a particular class of a set of classes). Additionally, or alternatively, automation platform 110 may use a naïve Bayesian classifier technique. In this case, automation platform 110 may perform binary recursive partitioning to split the data of the minimum feature set into partitions and/or branches, and use the partitions and/or branches to perform predictions (e.g., a ticket is a member of a particular class, that a particular class is resolvable using a particular ticket resolution asset, and/or the like). Based on using recursive partitioning, automation platform 110 may reduce utilization of computing resources relative to manual, linear sorting and analysis of data points, thereby enabling use of thousands, millions, or billions of data points to train a model, which may result in a more accurate model than using fewer data points.

Additionally, or alternatively, automation platform 110 may use a support vector machine (SVM) classifier technique to generate a non-linear boundary between data points in the training set. In this case, the non-linear boundary is used to classify test data (e.g., data relating to a ticket) into a particular class (e.g., a class indicating that the ticket is a first type of ticket, a second type of ticket, and/or the like; or that a class is automatable or not automatable using one or more ticket resolution assets).

Additionally, or alternatively, automation platform 110 may train the ticket analysis model using a supervised training procedure that includes receiving input to the model from a subject matter expert, which may reduce an amount of time, an amount of processing resources, and/or the like to train the ticket analysis model relative to an unsupervised training procedure. In some implementations, automation platform 110 may use one or more other model training techniques, such as a neural network technique, a latent semantic indexing technique, and/or the like. For example, automation platform 110 may perform an artificial neural network processing technique (e.g., using a two-layer feedforward neural network architecture, a three-layer feedforward neural network architecture, and/or the like) to perform pattern recognition with regard to patterns of whether tickets including different semantic descriptions are members of a particular class, whether the particular class is automatically resolvable using a ticket resolution asset that is configured to resolve another class of tickets, and/or the like. In this case, using the artificial neural network processing technique may improve an accuracy of a model generated by automation platform 110 by being more robust to noisy, imprecise, or incomplete data, and by enabling automation platform 110 to detect patterns and/or trends undetectable to human analysts or systems using less complex techniques.

As an example, automation platform 110 may preprocess the ticket data to validate the ticket data. For example, automation platform 110 may remove or alter incomplete ticket data (e.g., ticket data missing one or more fields), potentially inaccurate ticket data (e.g., ticket data with one or more field values differing by a threshold amount from an average field value), one or more entries in the one or more fields (e.g., numbers, special characters, stop words, punctuation, whitespace, stems, etc.), and/or the like. Further, automation platform 110 may perform entity extraction using natural language processing of the ticket data. In this case, automation platform 110 may format ticket data as a document term matrix with n-gram keywords. Further, automation platform 110 may perform unsupervised clustering on textual data of the ticket data to identify a subset of n-gram keywords associated with a set of tickets, and cluster the set of tickets into a set of classes (i.e., clusters) based on the subset of n-gram keywords that are clusterable using a clustering algorithm. In this way, automation platform 110 may generate classes of n-gram keywords to which tickets can be assigned and classified. Further, automation platform 110 may perform supervised clustering by using one or more previously identified classes that have been verified by a subject matter expert in the set of classes for clustering the set of tickets. In this case, automation platform 110 may receive input reviewing and confirming or removing one or more classes for ticket classification, which may reduce processing utilization relative to unsupervised clustering without user input. In some implementations, automation platform 110 may identify sub-classes using a sub-group generation technique and by performing topic modeling on the subset of n-gram keywords, thereby increasing a granularity of ticket classification.

Further, automation platform 110 may assign one or more attributes to one or more classes of tickets, such as an attribute identifying a technology, a module of a software development project, a functionality of a software development project, and/or the like to which tickets of a particular class pertain. Further, automation platform 110 may determine an attribute relating to resolution of tickets in a particular class. For example, automation platform 110 may determine a similarity between classes of tickets and other classes of tickets, tickets that have been resolved using one or more assets, and/or the like (e.g., a similarity based on the n-gram keywords, the technology, the module, the functionality, etc.), thereby enabling identification of an asset that may be used to automatically resolve a ticket in the class of tickets. Further, automation platform 110 may determine a predicted ticket inflow (e.g., a rate) or ticket volume (e.g., a total amount for a particular time period) for each class of tickets based on the ticket data, thereby enabling right-sized allocation of resources to an asset selected for automatically resolving a ticket in the class of tickets (e.g., or a subsequent ticket that is received and assigned to the class of tickets).

In some implementations, automation platform 110 may generate the automation plan based on results of classifying tickets. For example, automation platform 110 may determine one or more assets for ticket resolution, a resource allocation for operating the one or more assets, a cost associated with implementing the one or more assets, and/or the like. In some implementations, automation platform 110 may generate a user interface view associated with the automation plan. For example, automation platform 110 may dynamically generate one or more visualizations to provide descriptive analytics regarding the automation plan and the ticket classification associated therewith, such as a time series graph (e.g., predicting a ticket inflow), a bar graph, a column graph, a stacked bar graph, a stacked column graph. Additionally, or alternatively, automation platform 110 may generate area charts, bar charts, column charts, heat maps, pie charts, tree maps, combinations thereof, and/or the like. In some implementations, automation platform 110 may intelligently generate the user interface view based on a user input. For example, automation platform 110 may generate one or more visualization layers for a particular class of tickets, may store information identifying a user selection of a visualization layer, and may subsequently generate a similar visualization layer for another class of tickets, thereby reducing computing utilization relative to the user manually accessing relevant information for each class of tickets. In some implementations, automation platform 110 may dynamically generate a description of the one or more visualizations using a natural language process text generator, thereby enabling a user to determine a meaning of a visualization in a reduced amount of time relative to a non-described visualization, thereby reducing processing utilization.

In some implementations, automation platform 110 may determine the automation plan for a particular class of tickets. For example, automation platform 110 may determine an automation score for each class of tickets related to a predicted automatability for resolving a class of tickets of the set of classes of tickets using an asset available to automation platform 110. In this case, automation platform 110 may select a class of tickets for automation based on a highest automation score or a threshold automation score. Additionally, or alternatively, automation platform 110 may determine the automation plan based on a predicted inflow of tickets for a particular class of tickets. For example, based on a predicted inflow satisfying a threshold, automation platform 110 may determine to generate an automation plan to implement an asset to automatically resolve tickets that are received and are assigned to the particular class. In some implementations, automation platform 110 may rank or order one or more classes of tickets for automation plan generation. For example, automation platform 110 may apply a set of weights to a set of attributes of a set of classes of tickets (e.g., weights to criticality scores, automation scores, predicted inflow volume, and/or the like), to sort the set of classes in terms of priority for generating an automation plan.

Additionally, or alternatively, automation platform 110 may monitor use of a user interface to identify user preferences with regard to the user interface (e.g., which graphs the user is interacting with), and may dynamically update subsequent user interface views based on the user preferences. In some implementations, automation platform 110 may use artificial intelligence techniques to generate the user interface views, such as based on generating a visualization model based on visualization data relating to previous user usage of user interfaces including visualizations, other user's usages of user interfaces including visualizations, and/or the like. For example, automation platform 110 may use artificial intelligence techniques to identify relevant features of the ticket data (e.g., anomalous features, significant features, patterns, trends, etc.), may predict one or more user interface views that a user is associated with a threshold likelihood of viewing for a threshold amount of time (e.g., based on previous use of user interfaces and indicating that the predicted user interface is relevant to the user), and may generate one or more graphs for a predicted user interface view to identify the relevant features, thereby reducing computing utilization relative to a user manually reviewing all graphs to identify the relevant features.

In some implementations, automation platform 110 may generate a recommendation. For example, automation platform 110 may score one or more automation plans based on a resource utilization, a likelihood of success (e.g., a predicted likelihood that a ticket resolution asset is applicable to resolving a class of tickets), a cost of manual resolution of a class of tickets, and/or the like. In this case, automation platform 110 may determine that a subset of automation plans satisfy a threshold score, and may recommend implementation of the subset of automation plans. In some implementations, automation platform 110 may generate the recommendation based on using artificial intelligence techniques. For example, automation platform 110 may use data identifying success of previous automation plans, an accuracy of a classification of tickets, natural language user feedback on assets for automatically resolving tickets, and/or the like to generate a machine learning model of automation plans, as described above with regard to ticket classification, and may use the machine learning model of automation plans to evaluate one or more automation plans, and select a subset of automation plans to recommend.

Additionally, or alternatively, automation platform 110 may use the ticket analysis model to rank the set of recommended resolutions based on an amount of resources required to resolve the issue. For example, automation platform 110 may determine a set of values indicating an estimated amount of resources needed to resolve the issue. In this case, a value, in the set of values, may correspond to a recommended resolution, in the set of recommended resolutions. Automation platform 110 may rank the set of recommended resolutions based on determining the corresponding set of values indicating the estimated amount of resources needed to resolve the issue. In some cases, automation platform 110 may select a particular resolution for a class of tickets that corresponds to a value associated with a lowest estimated amount of resources needed to resolve the issue. By ranking resolutions based on an amount of resources (or an estimated amount of resources) needed to resolve the issue, automation platform 110 is able to conserve processing resources and/or network resources by selecting the most resource-efficient resolution.

In some implementations, automation platform 110 may use the ticket analysis model to select a particular resolution, from a set of recommended resolutions, for inclusion in an automation plan. For example, automation platform 110 may analyze the ticket data to determine the set of recommended resolutions for an issue associated with a particular class of tickets, and may rank the set of recommended resolutions. In this case, automation platform 110 may select the particular resolution, from the set of recommended resolutions, based on ranking the set of recommended resolutions.

In some implementations, automation platform 110 may use the ticket analysis model to select a particular resolution for inclusion in the automation plan that satisfies a threshold (or that satisfies multiple thresholds). The threshold(s) may indicate an effectiveness level of resolving an issue, an amount of resources to resolve an issue, an amount of time to resolve an issue, a percentage chance of resolving the issue, and/or the like. In some cases, such as when multiple resolutions in the set of recommended resolutions satisfy the threshold, automation platform 110 may select the particular resolution for the automation plan that satisfies the threshold by the largest margin. For example, if multiple resolutions indicate an 80%+ effectiveness level of resolving an issue, automation platform 110 may select the particular resolution with the highest predicted effectiveness level of resolving the issue.

In some implementations, automation platform 110 may train the ticket analysis model, classify tickets, and generate the automation plan based on a request. For example, automation platform 110 may receive a request from client device 105 for an automation plan, and may generate the automation plan as a response to the request. In some implementations, automation platform 110 may train the ticket analysis model, classify tickets, and generate the automation plan based on receiving tickets. For example, periodically, based on receiving a set of tickets, automation platform 110 may train the (or update a trained) ticket analysis model, and may use the ticket analysis model to classify the set of tickets. In this case, based on classifying the set of tickets into one or more classes, automation platform 110 may evaluate the one or more classes for automatic resolution using one or more assets for automatically resolving a ticket. Additionally, or alternatively, based on detecting availability of a new asset for automatically resolving a ticket, automation platform 110 may evaluate the one or more classes for automatic resolution using the new asset. Additionally, or alternatively, based on identifying a new class of tickets, automation platform 110 may determine a similarity to another class that is being automatically resolved, and may predict an effort (e.g., computing resources, cost, man-hours, etc.) associated with adapting an asset being used to automatically resolve the other class for use in automatically resolving the new class (e.g., to reprogram the asset, to allocate additional resources to the asset, to transfer data to a memory that is accessible by the asset, etc.).

As further shown in FIG. 1A, and by reference number 135, automation platform 110 may receive a request for automation plan information from client device 105. For example, a user may desire to receive a recommendation relating to implementing an automation plan, and automation platform 110 may identify stored information identifying one or more generated automation plans or may generate one or more automation plans as a response to the request. As shown by reference number 140, automation platform 110 may provide an automation plan user interface as a response to the request and to identify the one or more generated automation plans and/or information associated therewith, as described in more detail herein.

Figure 1B:
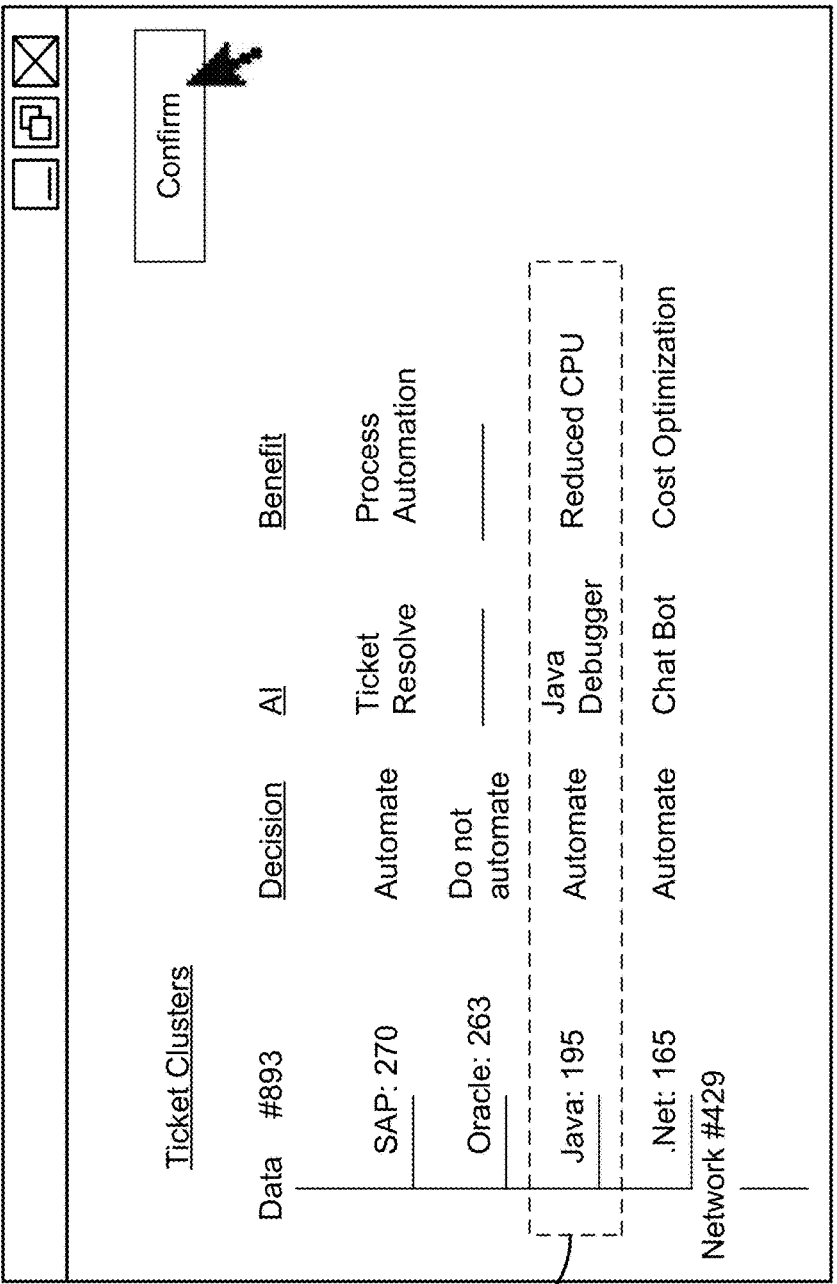

As shown in FIG. 1B, based on receiving the automation plan user interface from automation platform 110, client device 105 may provide the automation plan user interface for display. In this case, the automation plan user interface may include information identifying classes of tickets (e.g., data related tickets, network related tickets, etc.), sub-classes of tickets (e.g., SAP tickets, Oracle tickets, Java tickets, .Net tickets, etc.), and/or the like. For each sub-class of tickets, the automation plan user interface may include, based on a determination by automation platform 110, information identifying a recommendation relating to automation of resolution of the sub-class of tickets (e.g., to automate or to not automate), an identification of an artificial intelligence asset for automatically resolving the sub-class of tickets (e.g., Ticket Resolve, Java Debugger, Chat Bot), and/or the like. Further, the automation plan user interface may include, based on a determination by automation platform 110, information identifying a predicted benefit of implementing an asset for automated ticket resolution, such as information indicating a benefit from process automation, reduced central processing unit (CPU) utilization, a benefit from cost optimization, and/or the like.

In some implementations, automation platform 110 may automatically implement one or more of the automation plan recommendations relating to automating ticket resolution. For example, automation platform 110 may determine to automatically allocate resources to an application for automatically resolving tickets, a java debugging application, a chat bot application to interface with ticket submitters, and/or the like. In some implementations, automation platform 110 may determine to automatically implement a recommendation based on a score. For example, automation platform 110 may determine that an asset satisfies a threshold likelihood of success, a threshold reduction in processing resource utilization, a threshold cost reduction, and/or the like, and may automatically determine to implement the asset. Additionally, or alternatively, automation platform 110 may receive user input 145 via the automation plan user interface associated with selecting a portion of the automation plan and implementing the portion of the automation plan (e.g., to allocate resources for the Java Debugger asset and to automatically route tickets classified as pertaining to the Data class and the Java sub-class for resolution by the Java Debugger asset).

Figure 1C:
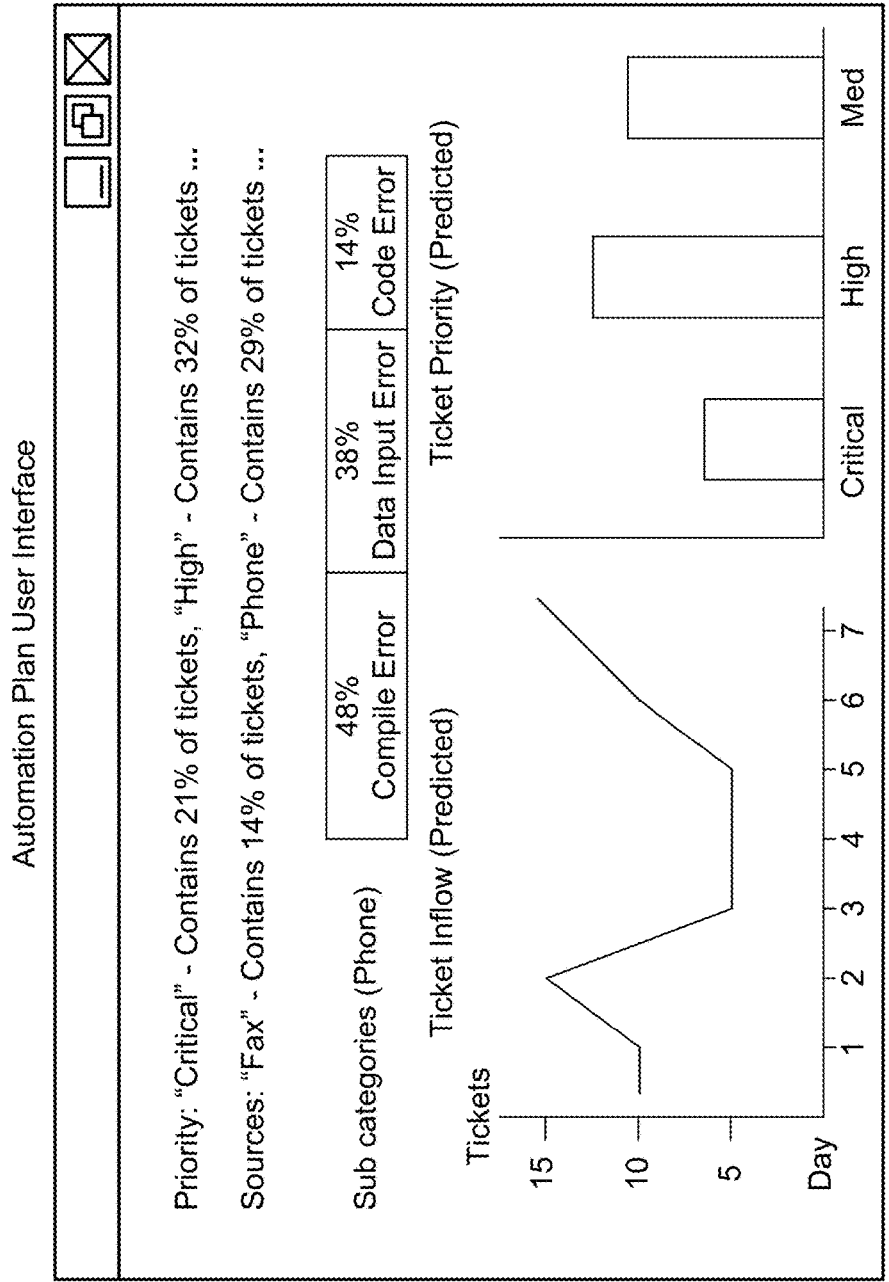

As shown in FIG. 1C, based on receiving the automation plan user interface from automation platform 110, client device 105 may provide a set of visualizations via the automation plan user interface. For example, the automation plan user interface may include one or more visualizations regarding the selected sub-class of tickets that is to be resolved using an asset for automatically resolving tickets. In this case, automation platform 110 may determine, and may provide visualizations relating to, a set of sub-classifications of the sub-class of tickets, such as a prioritization sub-classification (e.g., a sub-classification of each ticket as of critical importance, high importance, etc.), a source sub-classification of the sub-class of tickets (e.g., whether a ticket relates to fax communication, phone communication, etc.), a type sub-classification (e.g., whether tickets relating to phone communication relate to a compile error, a data input error, a code error, etc.), and/or the like. In some implementations, the prioritization may be a criticality score related to at least one of a predicted ticket inflow rate, a predicted ticket subject impact, or a ticket type for a class of ticket of the set of classes of tickets. Further, automation platform 110 may determine, and may provide visualizations relating to, ticket inflow, ticket priority, and/or the like.

Figure 1D:
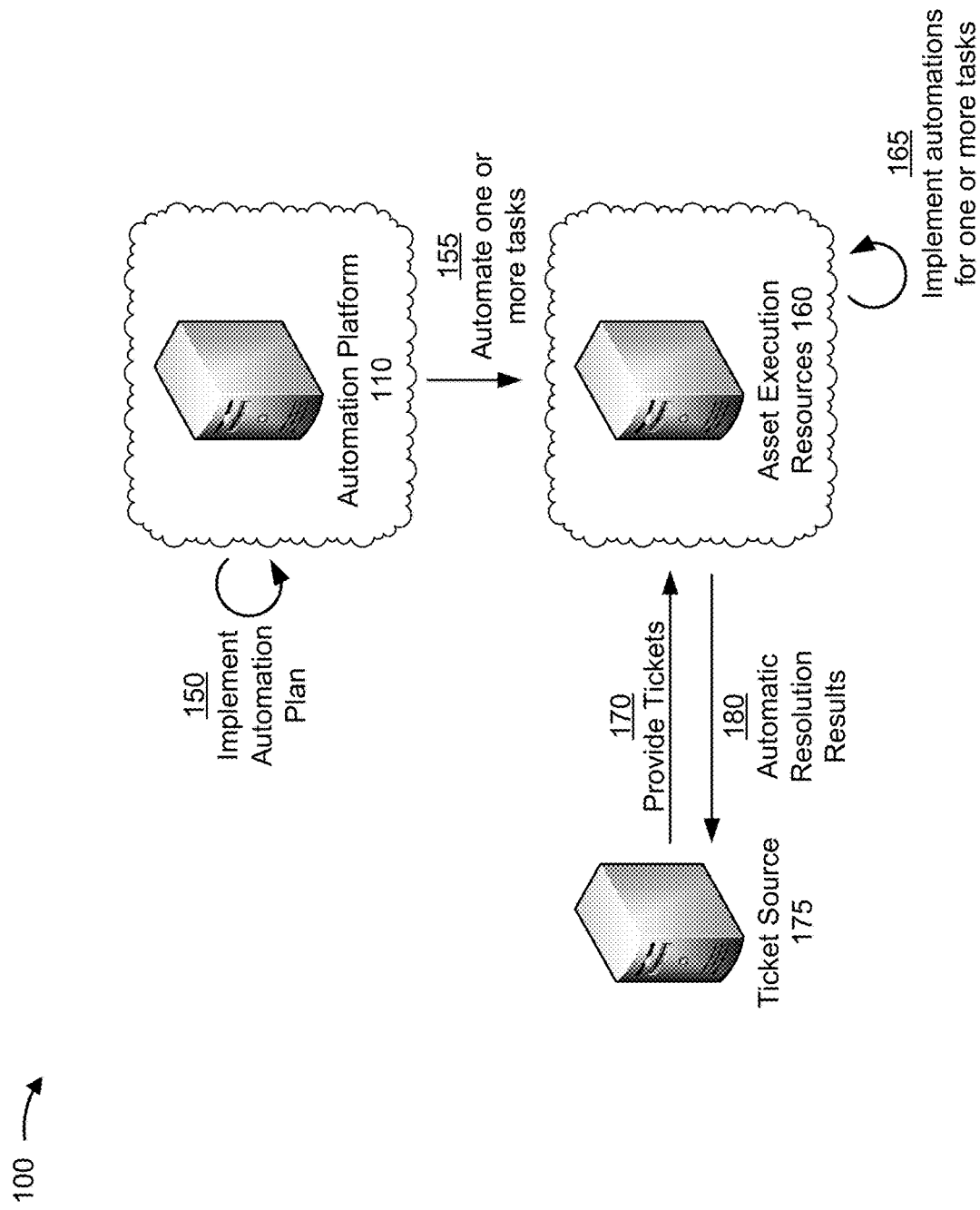

As shown in FIG. 1D, and by reference number 150, based on determining to implement a portion of the automation plan (e.g., based on a score satisfying a threshold, based on user interaction with a user interface, etc.), automation platform 110 may implement the automation plan. For example, as shown by reference number 155, automation platform 110 may allocate computing resources as asset execution resources 160, which may be one or more computing resources of automation platform 110 allocated for execution of an asset. As shown by reference number 165, asset execution resources 160 of automation platform 110 may implement automations for one or more tasks. For example, as shown by reference number 170, asset execution resources 160 of automation platform 110 may receive one or more tickets from ticket source 175. In this case, automation platform 110 may use the ticket analysis model to classify the one or more tickets. Based on classifying a ticket into a classification for which an asset is assigned and implemented using asset execution resources 160 to automatically resolve tickets, automation platform 110 may use asset execution resources 160 to automatically resolve the ticket and, as shown by reference number 180, provide results of automatic resolution.

In some implementations, automation platform 110 may use asset execution resources 160 to automatically generate additional program code, alter or remove existing program code, allocate and/or reallocate computing resources, automatically assign a developer to resolve the issue, etc. In some implementations, automation platform 110 may use asset execution resources 160 to access one or more APIs to gain permission to implement the particular resolution to a project to resolve one or more tickets. By automatically resolving the one or more tickets, automation platform 110 achieves faster issue resolution, thereby conserving network resources by decreasing a period of time where a network device is using additional resources to complete a task (e.g., a network device may use additional resources to complete a task when malfunctioning).

In some implementations, automation platform 110 may use asset execution resources 160 to automatically communicate with another device to implement a particular resolution to one or more tickets. For example, automation platform 110 may use asset execution resources 160 to communicate with another device to automatically assign a developer to resolve an issue associated with a ticket. In this case, the other device may store information such as a schedule of a developer, and automation platform 110 may access the schedule to add a task or schedule a meeting relating to resolving the issue. For example, automation platform 110 may determine a set of shifts for a set of developers, identify a developer that is active for an upcoming shift and has availability and/or skills to resolve a ticket (e.g., skills relating to a classification of the ticket), and may communicate with the other device to automatically assign a ticket associated with the issue to the developer. Similarly, based on the developer having previously resolved a similar issue or a similar ticket (e.g., the same ticket that has been submitted multiple times for a recurring issue), automation platform 110 may reassign the issue to the developer.

In some implementations, automation platform 110 may automatically communicate with another device to allow the other device to implement the particular resolution to the project. For example, automation platform 110 may automatically transmit information that indicates the particular resolution to another device (e.g., a server associated with client device 105, etc.), and the other device may implement the particular resolution by applying the particular resolution to code associated with the issue.

In some implementations, automation platform 110 may implement a particular resolution that includes modifying code and/or computing resources. For example, automation platform 110 may generate code, alter code, remove code, allocate computing resources, and/or reallocate computing resources to resolve the issue. In some cases, automation platform 110 may communicate with a data server associated with a software project to generate code, alter code, remove code, allocate computing resources, and/or reallocate computing resources. Additionally, or alternatively, automation platform 110 may automatically configure or reconfigure one or more devices, may start up one or more devices, power down one or more devices, and/or the like to resolve the issue. Additionally, or alternatively, automation platform 110 may move a robot or a drone to a particular area to gather information regarding the issue and/or the resolve the issue. Additionally, or alternatively, automation platform 100 may automatically order a replacement part for a delivery to a particular location to resolve a failure, and may cause a robot to autonomously install the replacement part.

In some implementations, automation platform 110 may automatically determine an effectiveness level of implementing the resolution. For example, automation platform 110 may automatically determine an effectiveness level of implementing the resolution by testing the resolution in a sandbox environment or by monitoring a project for which a ticket is generated after completion of the particular resolution to the ticket. As an example, automation platform 110 may implement a test script to mirror functionality of the project in a sandbox to determine whether the particular resolution resolved the issue. Additionally, or alternatively, automation platform 110 may determine an effectiveness level of implementing the resolution by receiving feedback. For example, automation platform 110 may receive feedback, and the feedback may indicate an effectiveness level of the resolution. In some cases, automation platform 110 may use the effectiveness information to reevaluate the asset for automatically resolving tickets of a class of tickets with regard to whether to continue to use the asset.

In this way, automation platform 110 reduces utilization of computing resources based on automatically classifying ticket data to reduce processing, reduces utilization of computing resources based on faster resolution of a ticket issue, reduces utilization of computing resources and/or network resources based on decreasing a period of time where a device is using additional resources to complete a task associated with an issue, or the like. Furthermore, faster resolution of a ticket issue improves user experience and minimizes time that a user may lose due to the ticket issue. Furthermore, using the ticket analysis model to automatically select assets for resolution of classes of tickets enables improved automation of ticket resolution as a quantity of assets increases and/or a quantity of tickets increases beyond what can be manually classified and assigned for resolution.

As indicated above, FIGS. 1A-1D are provided merely as an example. Other examples are possible and may differ from what was described with regard to FIGS. 1A-1D.

Figure 2:
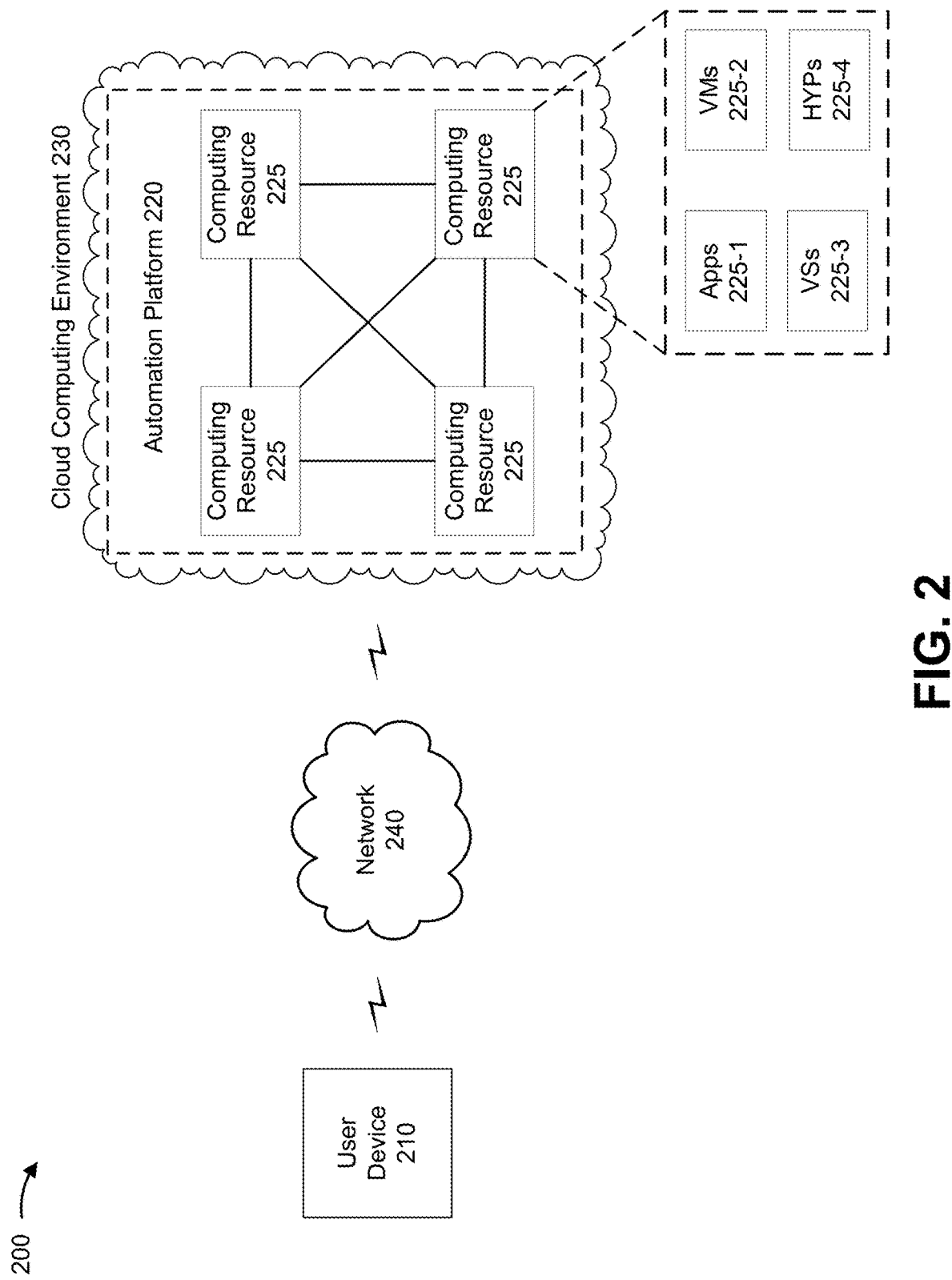
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, an automation platform 220, and a computing resource 225. Devices of environment 200 may interconnect via wired connections, wireless connections, or a combination of wired and wireless connections.

User device 210 includes one or more devices capable of receiving, generating, storing, processing, and/or providing information associated with providing a user interface associated with an automation plan. For example, user device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device.

Automation platform 220 includes one or more computing resources assigned to classify tickets, generate an automation plan for automatically resolving a class of tickets, implement the automation plan, and/or the like. For example, automation platform 220 may be a platform implemented by cloud computing environment 230 that may determine a classification for a ticket, and may assign the ticket for automatic resolution using an asset for automatic ticket resolution or ticket generation mitigation. In some implementations, automation platform 220 is implemented by computing resources 225 of cloud computing environment 230. In some implementations, automation platform 220 may allocate resources (e.g., computing resources 225) for executing an asset to automatically resolve a ticket.

Cloud computing environment 230 includes an environment that delivers computing as a service, whereby shared resources, services, etc. may be provided to classify tickets, generate automation plans, and automatically resolve tickets. Cloud computing environment 230 may provide computation, software, data access, storage, and/or other services that do not require end-user knowledge of a physical location and configuration of a system and/or a device that delivers the services. As shown, cloud computing environment 230 may include automation platform 20 and computing resource 225.

Computing resource 225 includes one or more personal computers, workstation computers, server devices, or another type of computation and/or communication device. In some implementations, computing resource 225 may host automation platform 220. The cloud resources may include compute instances executing in computing resource 225, storage devices provided in computing resource 225, data transfer devices provided by computing resource 225, etc. In some implementations, computing resource 225 may communicate with other computing resources 225 via wired connections, wireless connections, or a combination of wired and wireless connections.

As further shown in FIG. 2, computing resource 225 may include a group of cloud resources, such as one or more applications ("APPs") 225-1, one or more virtual machines ("VMs") 225-2, virtualized storage ("VSs") 225-3, one or more hypervisors ("HYPs") 225-4, or the like.

Application 225-1 includes one or more software applications that may be provided to or accessed by user device 210. Application 225-1 may eliminate a need to install and execute the software applications on user device 210. For example, application 225-1 may include software associated with automation platform 220 and/or any other software capable of being provided via cloud computing environment 230. In some implementations, one application 225-1 may send/receive information to/from one or more other applications 225-1, via virtual machine 225-2.

Virtual machine 225-2 includes a software implementation of a machine (e.g., a computer) that executes programs like a physical machine. Virtual machine 225-2 may be either a system virtual machine or a process virtual machine, depending upon use and degree of correspondence to any real machine by virtual machine 225-2. A system virtual machine may provide a complete system platform that supports execution of a complete operating system ("OS"). A process virtual machine may execute a single program, and may support a single process. In some implementations, virtual machine 225-2 may execute on behalf of a user (e.g., user device 210), and may manage infrastructure of cloud computing environment 230, such as data management, synchronization, or long-duration data transfers.

Virtualized storage 225-3 includes one or more storage systems and/or one or more devices that use virtualization techniques within the storage systems or devices of computing resource 225. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 225-4 provides hardware virtualization techniques that allow multiple operating systems (e.g., "guest operating systems") to execute concurrently on a host computer, such as computing resource 225. Hypervisor 225-4 may present a virtual operating platform to the guest operating systems, and may manage the execution of the guest operating systems. Multiple instances of a variety of operating systems may share virtualized hardware resources.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
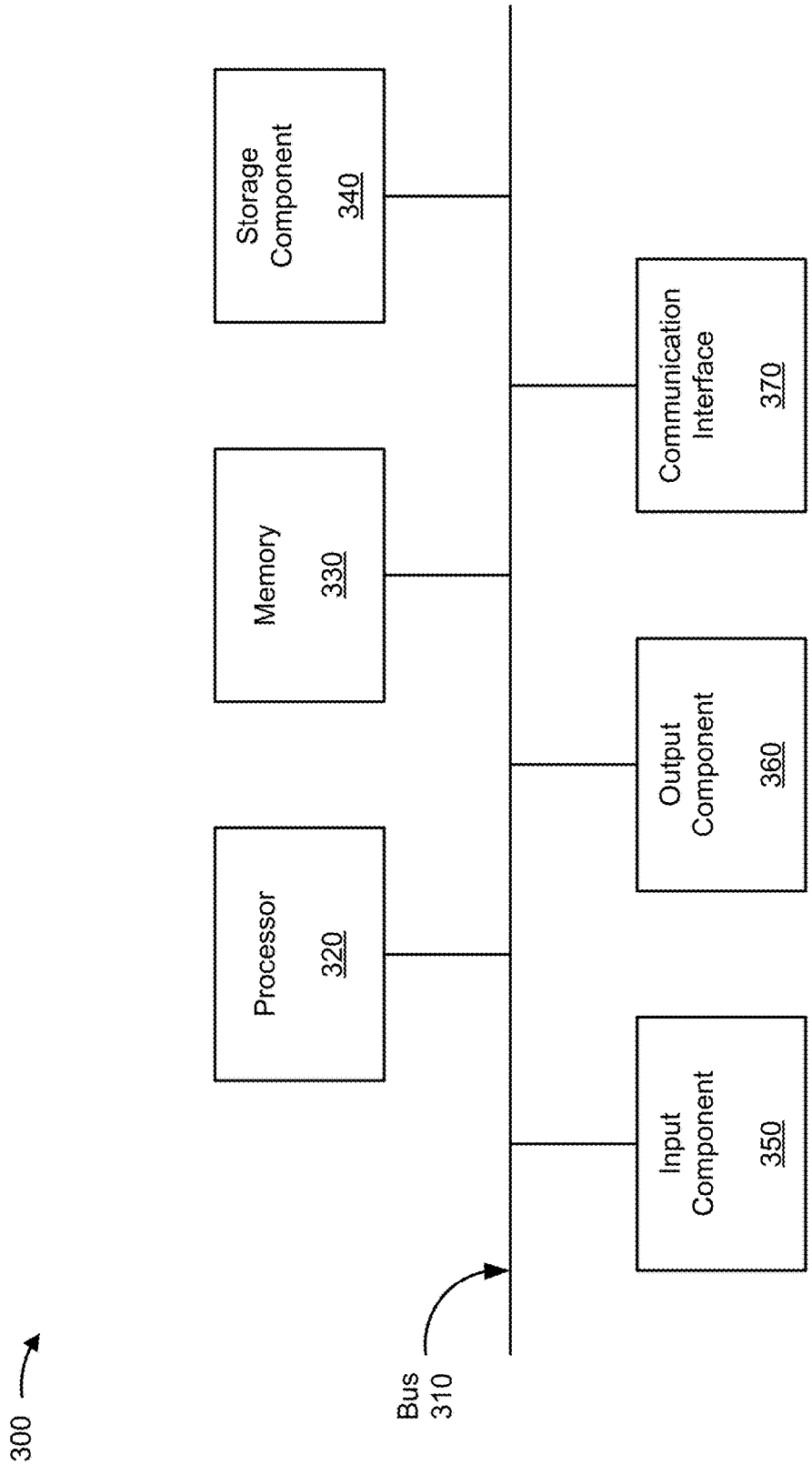
FIG. 3 is a diagram of example components of one or more devices of FIG. 2.

FIG. 3 is a diagram of example components of a device 300. Device 300 may correspond to user device 210, automation platform 220, and/or computing resource 225. In some implementations, user device 210, automation platform 220, and/or computing resource 225 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
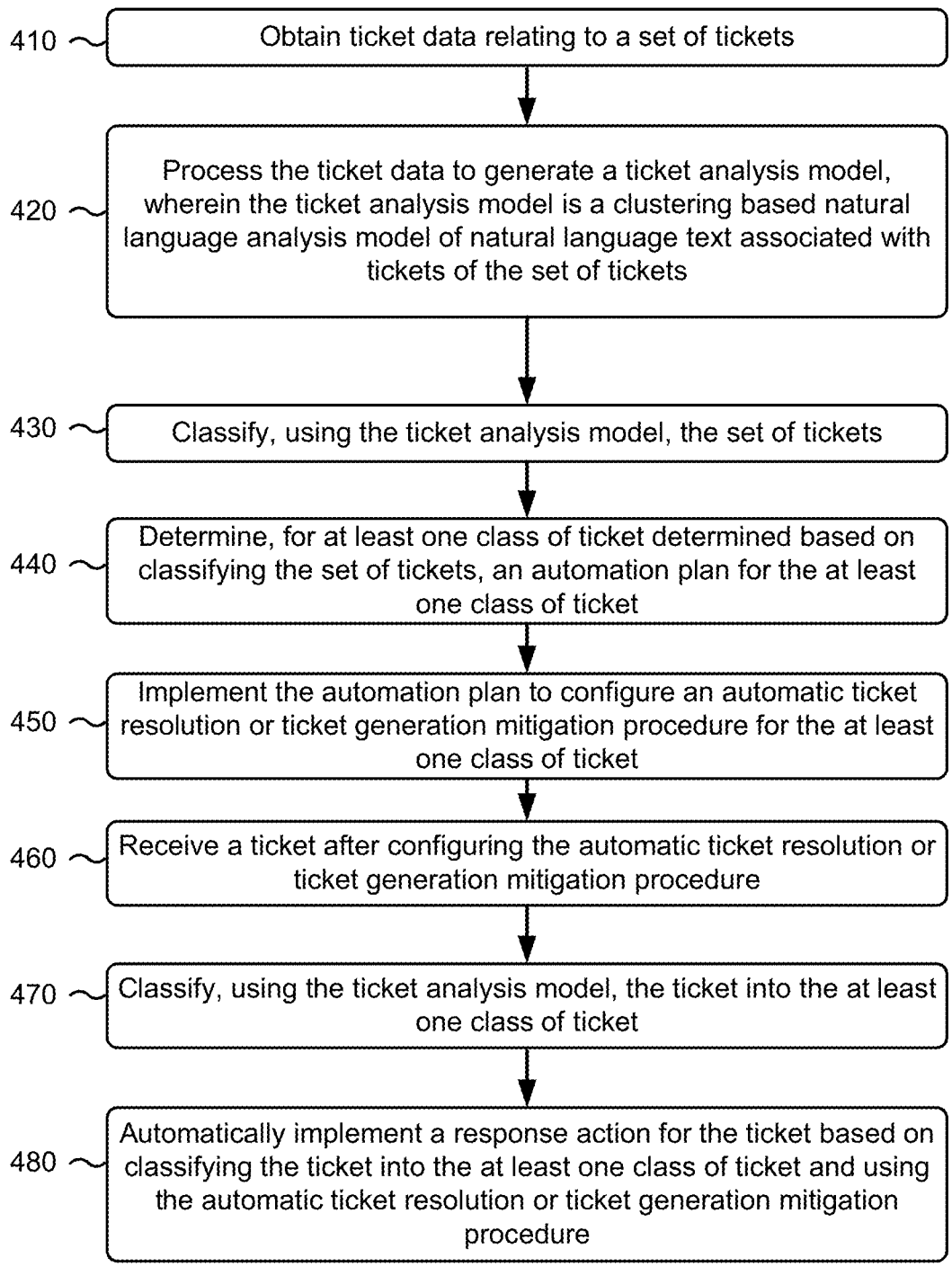
FIG. 4 is a flow chart of an example process for automation plan generation and ticket classification for automated ticket resolution.

FIG. 4 is a flow chart of an example process 400 for automation plan generation and ticket classification for automated ticket resolution. In some implementations, one or more process blocks of FIG. 4 may be performed by an automation platform (e.g. automation platform 220). In some implementations, one or more process blocks of FIG. 4 may be performed by another device or a group of devices separate from or including the automation platform (e.g. automation platform 220), such as a user device (e.g. user device 210) and a computing resource (e.g. computing resource 225).

As shown in FIG. 4, process 400 may include obtaining ticket data relating to a set of tickets (block 410). For example, the automation platform (e.g., using computing resource 225, processor 320, memory 330, storage component 340, input component 350, communication interface 370, and/or the like) may obtain ticket data relating to a set of tickets, as described above in connection with FIGS. 1A-1D.

As further shown in FIG. 4, process 400 may include processing the ticket data to generate a ticket analysis model, wherein the ticket analysis model is a clustering based natural language analysis model of natural language text associated with tickets of the set of tickets (block 420). For example, the automation platform (e.g., using computing resource 225, processor 320, memory 330, storage component 340, and/or the like) may process the ticket data to generate a ticket analysis model, as described above in connection with FIGS. 1A-1D. In some implementations, the ticket analysis model may be a clustering based natural language analysis model of natural language text associated with tickets of the set of tickets.

As further shown in FIG. 4, process 400 may include classifying, using the ticket analysis model, the set of tickets (block 430). For example, the automation platform (e.g., using computing resource 225, processor 320, memory 330, storage component 340, and/or the like) may classify, using the ticket analysis model, the set of tickets, as described above in connection with FIGS. 1A-1D.

As further shown in FIG. 4, process 400 may include determining, for at least one class of ticket determined based on classifying the set of tickets, an automation plan for the at least one class of ticket (block 440). For example, the automation platform (e.g., using computing resource 225, processor 320, memory 330, storage component 340, input component 350, communication interface 370, and/or the like) may determine, for at least one class of ticket determined based on classifying the set of tickets, an automation plan for the at least one class of ticket, as described above in connection with FIGS. 1A-1D.

As further shown in FIG. 4, process 400 may include implementing the automation plan to configure an automatic ticket resolution or ticket generation mitigation procedure for the at least one class of ticket (block 450). For example, the automation platform (e.g., using computing resource 225, processor 320, memory 330, storage component 340, and/or the like) may implement the automation plan to configure an automatic ticket resolution or ticket generation mitigation procedure for the at least one class of ticket, as described above in connection with FIGS. 1A-1D.

As further shown in FIG. 4, process 400 may include receiving a ticket after configuring the automatic ticket resolution or ticket generation mitigation procedure (block 460). For example, the automation platform (e.g., using computing resource 225, processor 320, memory 330, storage component 340, input component 350, communication interface 370, and/or the like) may receive a ticket after configuring the automatic ticket resolution or ticket generation mitigation procedure, as described above in connection with FIGS. 1A-1D.

As further shown in FIG. 4, process 400 may include classifying, using the ticket analysis model, the ticket into the at least one class of ticket (block 470). For example, the automation platform (e.g., using computing resource 225, processor 320, memory 330, storage component 340, and/or the like) may classify, using the ticket analysis model, the ticket into the at least one class of ticket, as described above in connection with FIGS. 1A-1D.

As further shown in FIG. 4, process 400 may include automatically implementing a response action for the ticket based on classifying the ticket into the at least one class of ticket and using the automatic ticket resolution or ticket generation mitigation procedure (block 480). For example, the automation platform (e.g., using computing resource 225, processor 320, memory 330, storage component 340, input component 350, output component 360, communication interface 370, and/or the like) may automatically implement a response action for the ticket based on classifying the ticket into the at least one class of ticket and using the automatic ticket resolution or ticket generation mitigation procedure, as described above in connection with FIGS. 1A-1D.

Process 400 may include additional implementations, such as any single implementation or any combination of implementations described below and/or in connection with one or more other processes described elsewhere herein.

In some implementations, the automation platform may determine a set of criticality scores for a set of classes of tickets determined based on classifying the set of tickets, and may select the at least one class of ticket, from the set of classes of tickets, for determining the automation plan based on the set of criticality scores for the set of classes, where a criticality score, of the set of criticality scores, is related to at least one of a predicted ticket inflow rate, a predicted ticket subject impact, or a ticket type for a class of ticket of the set of classes of tickets. Additionally, when determining the automation plan, the automation platform may determine the automation plan for the at least one class based on selecting the at least one class of ticket.

In some implementations, the automation platform may determine a set of automation scores for a set of classes of tickets determined based on classifying the set of tickets, where an automation score, of the set of automation scores, is related to a predicted automatability for resolving a class of tickets of the set of classes of tickets, and may select the at least one class of ticket, from the set of classes of tickets, for determining the automation plan based on the set of automation scores for the set of classes. Additionally, when determining the automation plan, the automation platform may determine the automation plan for the at least one class of ticket based on selecting the at least one class. In some implementations, when processing the ticket data to generate the ticket analysis model, the automation platform may process the ticket data using at least one of unsupervised clustering of a set of n-gram keywords of the natural language text or supervised clustering of the set of n-gram keywords of the natural language text.

In some implementations, the automation platform may generate a visualization model based on visualization data identifying a set of analytics and a set of user interactions with the set of analytics, may determine, based on the visualization model, a predicted user interface view for data relating to one or more predictions for the at least one class of ticket, where the predicted user interface view is predicted to minimize a quantity of user interactions to view information relating to the at least one class of ticket, and may provide the predicted user interface view for display. In some implementations, when determining the automation plan, the automation platform may identify an asset catalogue storing information identifying a set of ticket resolution descriptions, and may generate, based on the set of ticket resolution descriptions, the automatic ticket resolution or ticket generation mitigation procedure.

In some implementations, when automatically implementing the response action, the automation platform may generate program code to resolve the ticket based on the automatic ticket resolution or ticket generation mitigation procedure, and may communicate with another device to automatically deploy the program code to the other device. In some implementations, when automatically implementing the response action, the automation platform may select an application, from an application store, based on a class of the ticket, where the class is included in the at least one class of ticket, and where the application is associated with resolving tickets of the class, and may communicate with another device to provide the ticket for processing using the application.

In some implementations, when determining the automation plan, the automation platform may process a set of application descriptions for a set of applications, may determine, based on processing the set of application descriptions, a set of application scores, where the set of application scores relate to a likelihood that an application, of the set of applications, is usable for automatically resolving a class of ticket of the at least one class of ticket, and may select, based on the set of application scores, a particular application, of the set of applications, for use in resolving the class of ticket.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
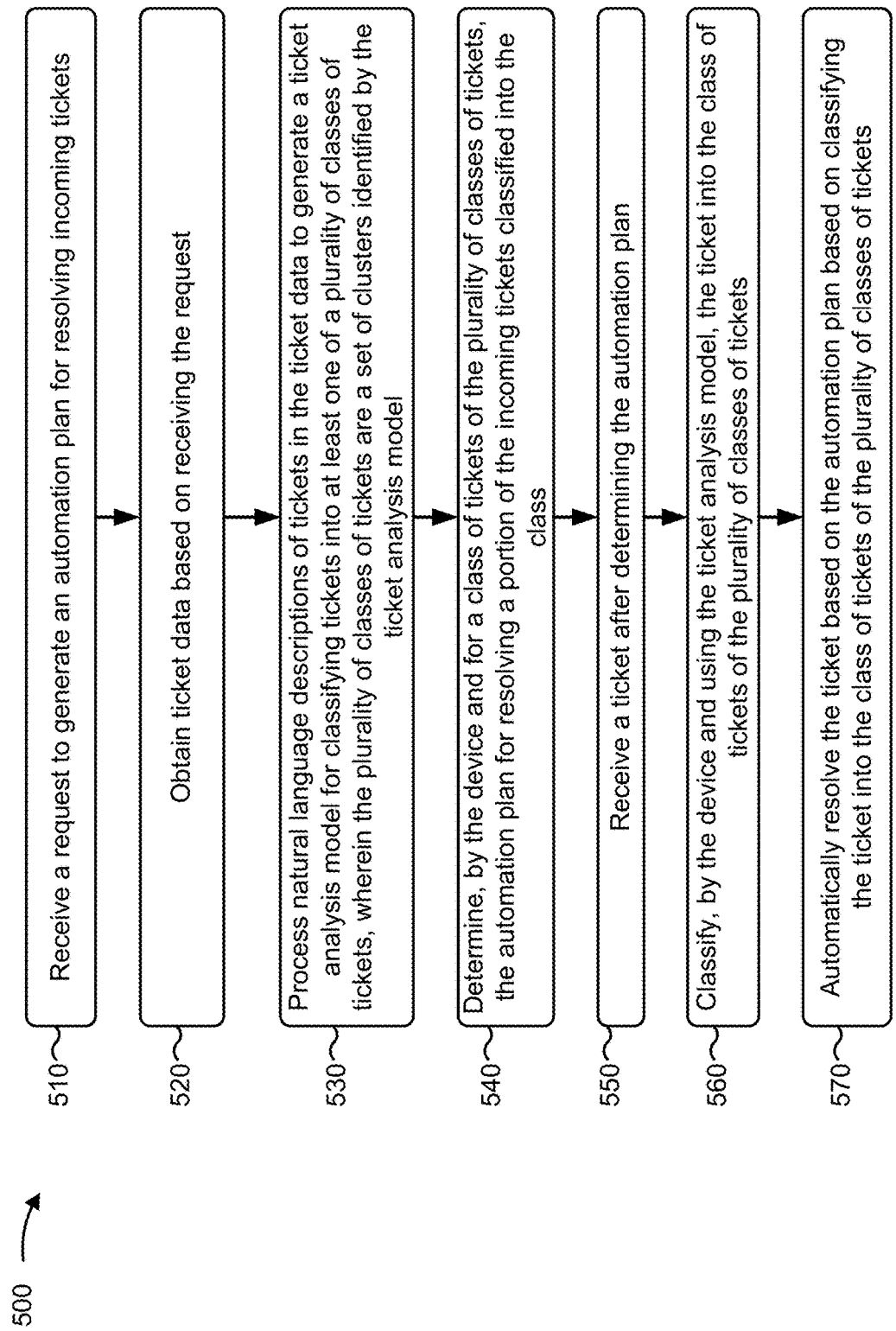
FIG. 5 is a flow chart of an example process for automation plan generation and ticket classification for automated ticket resolution.

FIG. 5 is a flow chart of an example process 500 for automation plan generation and ticket classification for automated ticket resolution. In some implementations, one or more process blocks of FIG. 5 may be performed by an automation platform (e.g. automation platform 220). In some implementations, one or more process blocks of FIG. 5 may be performed by another device or a group of devices separate from or including the automation platform (e.g. automation platform 220), such as a user device (e.g. user device 210) and a computing resource (e.g. computing resource 225).

As shown in FIG. 5, process 500 may include receiving a request to generate an automation plan for resolving incoming tickets (block 510). For example, the automation platform (e.g., using computing resource 225, processor 320, memory 330, storage component 340, input component 350, communication interface 370, and/or the like) may receive a request to generate an automation plan for resolving incoming tickets, as described above in connection with FIGS. 1A-1D.

As further shown in FIG. 5, process 500 may include obtaining ticket data based on receiving the request (block 520). For example, the automation platform (e.g., using computing resource 225, processor 320, memory 330, storage component 340, input component 350, communication interface 370, and/or the like) may obtain ticket data based on receiving the request, as described above in connection with FIGS. 1A-1D.

As further shown in FIG. 5, process 500 may include processing natural language descriptions of tickets in the ticket data to generate a ticket analysis model for classifying tickets into at least one of a plurality of classes of tickets, wherein the plurality of classes of tickets are a set of clusters identified by the ticket analysis model (block 530). For example, the automation platform (e.g., using computing resource 225, processor 320, memory 330, storage component 340, and/or the like) may process natural language descriptions of tickets in the ticket data to generate a ticket analysis model for classifying tickets into at least one of a plurality of classes of tickets, as described above in connection with FIGS. 1A-1D. In some implementations, the plurality of classes of tickets may be a set of clusters identified by the ticket analysis model.

As further shown in FIG. 5, process 500 may include determining, for a class of tickets of the plurality of classes of tickets, the automation plan for resolving a portion of the incoming tickets classified into the class (block 540). For example, the automation platform (e.g., using computing resource 225, processor 320, memory 330, storage component 340, and/or the like) may determine, for a class of tickets of the plurality of classes of tickets, the automation plan for resolving a portion of the incoming tickets classified into the class, as described above in connection with FIGS. 1A-1D.

As further shown in FIG. 5, process 500 may include receiving a ticket after determining the automation plan (block 550). For example, the automation platform (e.g., using computing resource 225, processor 320, memory 330, storage component 340, and/or the like) may receive a ticket after determining the automation plan, as described above in connection with FIGS. 1A-1D.

As further shown in FIG. 5, process 500 may include classifying, using the ticket analysis model, the ticket into the class of tickets of the plurality of classes of tickets (block 560). For example, the automation platform (e.g., using computing resource 225, processor 320, memory 330, storage component 340, and/or the like) may classify, using the ticket analysis model, the ticket into the class of tickets of the plurality of classes of tickets, as described above in connection with FIGS. 1A-1D.

As further shown in FIG. 5, process 500 may include automatically resolving the ticket based on the automation plan based on classifying the ticket into the class of tickets of the plurality of classes of tickets (block 570). For example, the automation platform (e.g., using computing resource 225, processor 320, memory 330, storage component 340, and/or the like) may automatically resolve the ticket based on the automation plan based on classifying the ticket into the class of tickets of the plurality of classes of tickets, as described above in connection with FIGS. 1A-1D.

Process 500 may include additional implementations, such as any single implementation or any combination of implementations described below and/or in connection with one or more other processes described elsewhere herein.

In some implementations, the automation platform may pre-process the ticket data, and pre-processing the ticket data may include at least one of removing numbers from the ticket data, removing special characters from the ticket data, removing stop words from the ticket data, removing punctuation from the ticket data, removing whitespaces from the ticket data, or performing a stemming operation on words of the ticket data. In some implementations, when processing the natural language descriptions of tickets, the automation platform may extract entities from the natural language descriptions of tickets, and may generate the set of clusters based on extracting the entities from the natural language descriptions. In some implementations, the automation platform may determine a predicted inflow for the class of tickets, may determine that the predicted inflow satisfies a threshold, and may determine the automation plan based on determining that the predicted inflow satisfies the threshold.

In some implementations, when automatically resolving the ticket, the automation platform may transmit an alert to a preselected entity, where the alert identifies an issue relating to the class of tickets of the plurality of classes of tickets, and may assign the ticket to the preselected entity. In some implementations, when automatically resolving the ticket, the automation platform may automatically allocate computing resources for ticket resolution, where an amount of computing resources is selected based on the class of tickets of the plurality of classes of tickets, and may use the computing resources to resolve the ticket based on automatically allocating the computing resources. In some implementations, the automation platform may order the plurality of classes of tickets based on one or more characteristics of the plurality of classes of tickets, and may select the class of tickets of the plurality of classes of tickets for the automation plan based on ordering the plurality of classes of tickets.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
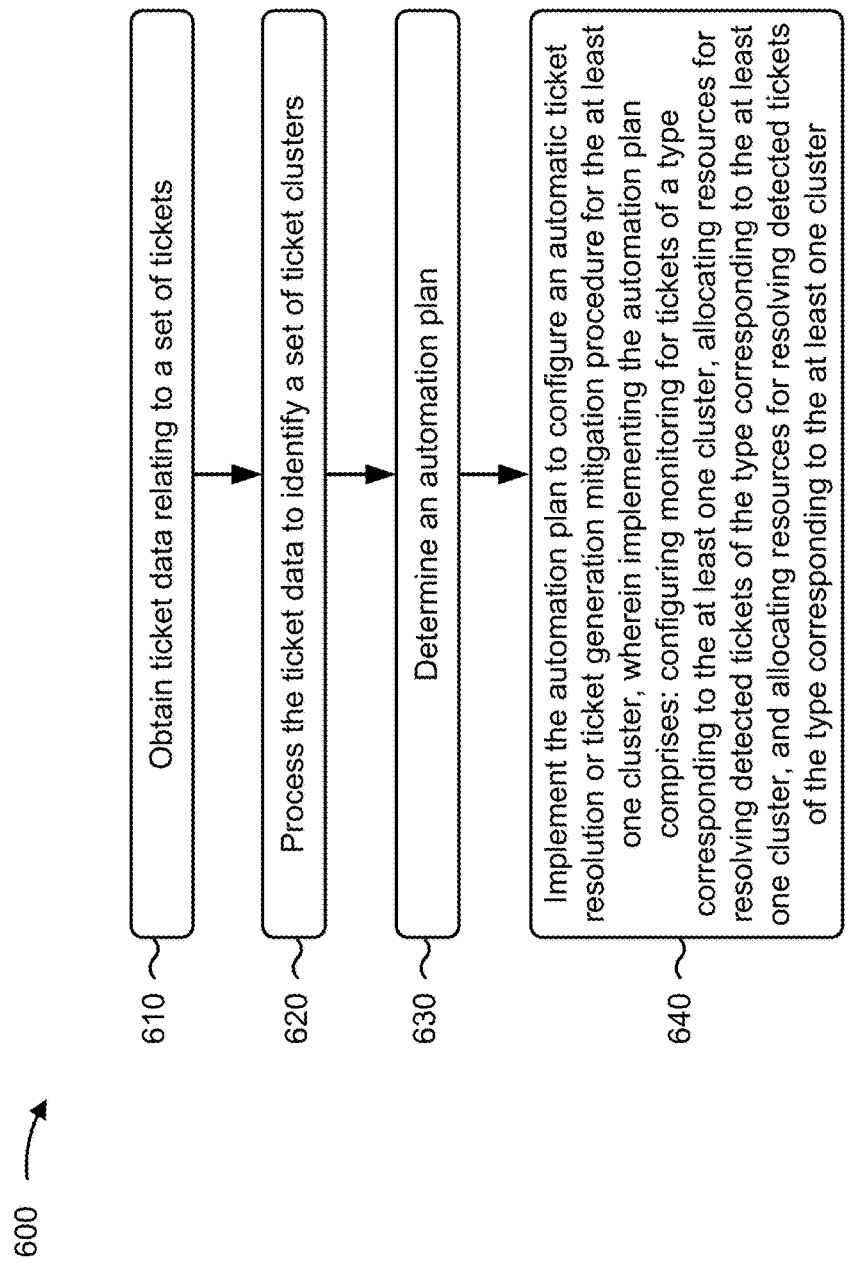
FIG. 6 is a flow chart of an example process for automation plan generation and ticket classification for automated ticket resolution.

FIG. 6 is a flow chart of an example process 600 for automation plan generation and ticket classification for automated ticket resolution. In some implementations, one or more process blocks of FIG. 6 may be performed by an automation platform (e.g. automation platform 220). In some implementations, one or more process blocks of FIG. 6 may be performed by another device or a group of devices separate from or including the automation platform (e.g. automation platform 220), such as a user device (e.g. user device 210) and a computing resource (e.g. computing resource 225).

As shown in FIG. 6, process 600 may include obtaining ticket data relating to a set of tickets (block 610). For example, the automation platform (e.g., using computing resource 225, processor 320, memory 330, storage component 340, input component 350, communication interface 370, and/or the like) may obtain ticket data relating to a set of tickets, as described above in connection with FIGS. 1A-1D.

As further shown in FIG. 6, process 600 may include processing the ticket data to identify a set of ticket clusters (block 620). For example, the automation platform (e.g., using computing resource 225, processor 320, memory 330, storage component 340, and/or the like) may process the ticket data to identify a set of ticket clusters, as described above in connection with FIGS. 1A-1D.

As further shown in FIG. 6, process 600 may include determining, for at least one cluster, an automation plan (block 630). For example, the automation platform (e.g., using computing resource 225, processor 320, memory 330, storage component 340, and/or the like) may determine, for at least one cluster, an automation plan, as described above in connection with FIGS. 1A-1D.

As further shown in FIG. 6, process 600 may include implementing the automation plan to configure an automatic ticket resolution or ticket generation mitigation procedure for the at least one cluster, wherein implementing the automation plan comprises configuring monitoring for tickets of a type corresponding to the at least one cluster, allocating resources for resolving detected tickets of the type corresponding to the at least one cluster, and providing a user interface including a visualization of data relating to the resolving of detected tickets of the type corresponding to the at least one cluster (block 640). For example, the automation platform (e.g., using computing resource 225, processor 320, memory 330, storage component 340, and/or the like) may implement the automation plan to configure an automatic ticket resolution or ticket generation mitigation procedure for the at least one cluster, as described above in connection with FIGS. 1A-1D. In some implementations, when implementing the automation plan, the automation platform may configure monitoring for tickets of a type corresponding to the at least one cluster, may allocate resources for resolving detected tickets of the type corresponding to the at least one cluster, and may provide a user interface including a visualization of data relating to the resolving of detected tickets of the type corresponding to the at least one cluster.

Process 600 may include additional implementations, such as any single implementation or any combination of implementations described below and/or in connection with one or more other processes described elsewhere herein.

In some implementations, the automation platform may receive a ticket, may classify the ticket into the at least one cluster based on a natural language description of an issue included in the ticket, and may use the allocated resources to resolve the issue included in the ticket. In some implementations, the automation platform may update the user interface to indicate that the ticket is resolved. In some implementations, the automation platform may predict a ticket volume for the at least one cluster, and allocate the resources based on the ticket volume for the at least one cluster.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

In this way, some implementations described herein may provide for a cloud platform (e.g., automation platform 220) to automatically classify ticket data, identify an automation plan for automatically resolving tickets, and to implement the automation plan to automatically resolve the tickets. In this way, the cloud platform reduces utilization of computing resources based on faster resolution of a ticket issue (e.g., less resources may be needed to resolve the ticket issue), reduces utilization of computing resources and/or network resources based on decreasing a period of time where a network device is using additional resources to complete a task (e.g. a network device may use less resources to complete a task when operating properly), or the like. By reducing the utilization of computing resources, the cloud platform improves overall system performance due to efficient and effective allocation of resources. Furthermore, faster resolution of a ticket issue improves user experience and minimizes time that a user may lose due to the ticket issue (e.g., a user may be unable to work if experiencing a technical error).

Furthermore, some implementations described herein use a rigorous, computerized process to classify tickets, generate automation plans, and resolve classified tickets that were not previously performed or were previously performed using subjective human intuition or input. For example, currently there does not exist a technique to accurately generate an automation plan for automating resolution of thousands, millions, or tens of millions of tickets. Finally, automating the process for classifying tickets and generating an automation plan conserves computing resources (e.g., processor resources, memory resources, and/or the like) that would otherwise be wasted in attempting to manually and inefficiently complete ticket resolution tasks that may be automatable, by ensuring that automatable ticket resolution procedures are implemented when available for a particular class of ticket.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more memories; and
   one or more processors, communicatively coupled to the one or more memories, to:
      obtain ticket data related to tickets,
         wherein the ticket data indicates one or more issues to be resolved;
      process the ticket data to generate a ticket analysis model,
         wherein the ticket analysis model is a clustering based natural language analysis model of natural language text associated with the ticket data;
      classify, using the ticket analysis model, the tickets into at least one of a plurality of classes of tickets, wherein the plurality of classes of tickets are associated with a set of clusters identified by the ticket analysis model;
      rank a set of recommended resolutions based on determining a corresponding set of values indicating an estimated amount of resources needed to resolve an issue, of the issues, associated with the tickets;
      select from the set of recommended resolutions, based on the ranking, and for inclusion in an automation plan, a resolution that corresponds to a lowest estimated amount of resources needed to resolve the issue;
      determine, based on selecting the resolution and for at least one class of ticket of the plurality of classes of tickets, the automation plan for resolving at least a portion of the tickets classified into the at least one class of ticket;
      implement the automation plan to configure an automatic ticket resolution or a ticket generation mitigation procedure for the at least one class of ticket;
      receive a second ticket after configuring the automatic ticket resolution or the ticket generation mitigation procedure;
      classify, using the ticket analysis model, the second ticket into the at least one class of ticket; and
      automatically implement a response action for the ticket based on classifying the ticket into the at least one class of ticket and using the automatic ticket resolution or the ticket generation mitigation procedure.

2. The device of claim 1, wherein the one or more processors are further to:
   determine a set of criticality scores for a set of classes of tickets determined based on classifying the tickets;
   select the at least one class of ticket, from the set of classes of tickets, for determining the automation plan based on the set of criticality scores for the set of classes,
      wherein a criticality score, of the set of criticality scores, is related to at least one of a predicted ticket inflow rate, a predicted ticket subject impact, or a ticket type for the at least one class of ticket of the set of classes of tickets; and
   wherein the one or more processors, that cause the one or more processors to determine the automation plan, cause the one or more processors to:
      determine the automation plan for the at least one class based on selecting the at least one class of ticket.

3. The device of claim 1, wherein the one or more processors are further to:
   determine a set of automation scores for the at least one class of ticket determined based on classifying the tickets,
      wherein an automation score, of the set of automation scores, is related to a predicted automatability for resolving the at least one class of ticket;
   select the at least one class of ticket for determining the automation plan based on the set of automation scores; and
   wherein the one or more processors, that cause the one or more processors to determine the automation plan, cause the one or more processors to:
      determine the automation plan for the at least one class of ticket based on selecting the at least one class of ticket.

4. The device of claim 1, wherein the one or more processors, when processing the ticket data to generate the ticket analysis model, are to:
   process the ticket data using at least one of unsupervised clustering of a set of n-gram keywords of the natural language text or supervised clustering of the set of n-gram keywords of the natural language text.

5. The device of claim 1, wherein the one or more processors, are further to:
   generate a visualization model based on visualization data identifying a set of analytics and a set of user interactions with the set of analytics;
   determine, based on the visualization model, a predicted user interface view for data relating to one or more predictions for the at least one class of ticket,
      wherein the predicted user interface view is predicted to minimize a quantity of user interactions to view information relating to the at least one class of ticket; and
   provide the predicted user interface view for display.

6. The device of claim 1, wherein the one or more processors, when determining the automation plan, are to:

identify an asset catalogue storing information identifying a set of ticket resolution descriptions; and
generate, based on the set of ticket resolution descriptions, the automatic ticket resolution or the ticket generation mitigation procedure.

7. The device of claim 1, wherein the one or more processors, when automatically implementing the response action, are to:
generate program code to resolve the ticket based on the automatic ticket resolution or the ticket generation mitigation procedure; and
communicate with another device to automatically deploy the program code to the other device.

8. The device of claim 1, wherein the one or more processors, when automatically implementing the response action, are to:
select an application, from an application store, based on the at least one class of ticket,
wherein the application is associated with resolving tickets of the at least one class of ticket; and
communicate with another device to provide the ticket for processing using the application.

9. The device of claim 1, wherein the one or more processors, when determining the automation plan, are to:
process a set of application descriptions for a set of applications;
determine, based on processing the set of application descriptions, a set of application scores,
wherein the set of application scores relate to a likelihood that an application, of the set of applications, is usable for automatically resolving the at least one class of ticket; and
select, based on the set of application scores, a particular application, of the set of applications, for resolving the at least one class of ticket.

10. A method, comprising:
receiving, by a device, a request to generate an automation plan for resolving tickets;
obtaining, by the device and based on receiving the request, ticket data that indicates one or more issues to be resolved;
processing, by the device, natural language descriptions of the tickets in the ticket data to generate a ticket analysis model;
classifying, by the device and using the ticket analysis model, the tickets into at least one of a plurality of classes of tickets, wherein the plurality of classes of tickets are associated with a set of clusters identified by the ticket analysis model;
ranking, by the device, a set of recommended resolutions based on determining a corresponding set of values indicating an estimated amount of resources needed to resolve an issue, of the issues, associated with the tickets;
selecting from the set of recommended resolutions, by the device, based on the ranking, and for inclusion in the automation plan, a resolution that corresponds to a lowest estimated amount of resources needed to resolve the issue;
determining, by the device, based on selecting the resolution and for at least one class of ticket of the plurality of classes of tickets, the automation plan for resolving at least a portion of the tickets classified into the at least one class of ticket;
receiving, by the device, a second ticket after determining the automation plan;

classifying, by the device and using the ticket analysis model, the second ticket into the at least one class of ticket; and
automatically resolving, by the device, the second ticket based on the automation plan based on classifying the second ticket into the at least one class of ticket.

11. The method of claim 10, further comprising
pre-processing the ticket data, and
wherein pre-processing the ticket data comprises at least one of:
removing numbers from the ticket data,
removing special characters from the ticket data,
removing stop words from the ticket data,
removing punctuation from the ticket data,
removing whitespaces from the ticket data, or
performing a stemming operation on words of the ticket data.

12. The method of claim 10, wherein processing the natural language descriptions of the tickets comprises:
extracting entities from the natural language descriptions of the tickets; and
generating the set of clusters based on extracting the entities from the natural language descriptions.

13. The method of claim 10, further comprising:
determining a predicted inflow for the at least one class of ticket;
determining that the predicted inflow satisfies a threshold; and
determining the automation plan based on determining that the predicted inflow satisfies the threshold.

14. The method of claim 10, wherein automatically resolving the second ticket comprises:
transmitting an alert to a preselected entity,
wherein the alert identifies an issue relating to the at least one class of ticket; and
assigning the second ticket to the preselected entity.

15. The method of claim 10, wherein automatically resolving the ticket comprises:
automatically allocating computing resources for ticket resolution,
wherein an amount of computing resources is selected based on the at least one class of ticket; and
using the computing resources to resolve the ticket based on automatically allocating the computing resources.

16. The method of claim 10, further comprising:
ordering the plurality of classes of tickets based on one or more characteristics of the plurality of classes of tickets; and
selecting the at least one class of ticket of the plurality of classes of tickets for the automation plan based on ordering the plurality of classes of tickets.

17. A non-transitory computer-readable medium storing instructions, the instructions comprising
one or more instructions that, when executed by one or more processors, cause the one or more processors to:
obtain ticket data related to tickets,
wherein the ticket data indicates one or more issues to be resolved;
process the ticket data to generate a ticket analysis model;
classify, using the ticket analysis model, the tickets into at least one cluster of a plurality of clusters identified by the ticket analysis model;
rank a set of recommended resolutions based on determining a corresponding set of values indicating an estimated amount of resources needed to resolve an issue, of the issues, associated with the tickets;

select from the set of recommended resolutions, based on the ranking, and for inclusion in an automation plan, a resolution that corresponds to a lowest estimated amount of resources needed to resolve the issue;
determine, based on selecting the resolution and for at least one cluster of the plurality of clusters, the automation plan for resolving at least a portion of the tickets classified into the at least one cluster;
implement the automation plan to configure an automatic ticket resolution or a ticket generation mitigation procedure for the at least one cluster,
wherein implementing the automation plan comprises:
configuring monitoring for tickets of a type corresponding to the at least one cluster,
allocating resources for resolving the tickets of the type corresponding to the at least one cluster, and
providing a user interface including a visualization of data relating to resolving of the tickets of the type corresponding to the at least one cluster;
receive a second ticket after implementing the automation plan;
classify, using the ticket analysis model, the second ticket into the at least one cluster; and
automatically implement a response action based on classifying the ticket into the at least one cluster and using the automatic ticket resolution or the ticket generation mitigation procedure.

18. The non-transitory computer-readable medium of claim 17, wherein the one or more instructions, when executed by the one or more processors, further cause the one or more processors to:
classify the tickets into the at least one cluster based on a natural language description of the issues associated with the tickets; and
use the allocated resources to resolve the issues associated with the tickets.

19. The non-transitory computer-readable medium of claim 18, wherein the one or more instructions, when executed by the one or more processors, further cause the one or more processors to:
update the user interface to indicate that the second ticket is resolved.

20. The non-transitory computer-readable medium of claim 17, wherein the one or more instructions, when executed by the one or more processors, further cause the one or more processors to:
predict a ticket volume for the at least one cluster; and
allocate the resources based on the ticket volume for the at least one cluster.

* * * * *